Sept. 18, 1962   A. F. SMITH   3,054,684
PROCESS AND APPARATUS FOR TREATING FLUID MATERIALS
Filed Oct. 14, 1959   3 Sheets-Sheet 1

INVENTOR.
ARTHUR F. SMITH
BY Frank E. Robbins
ATTORNEY

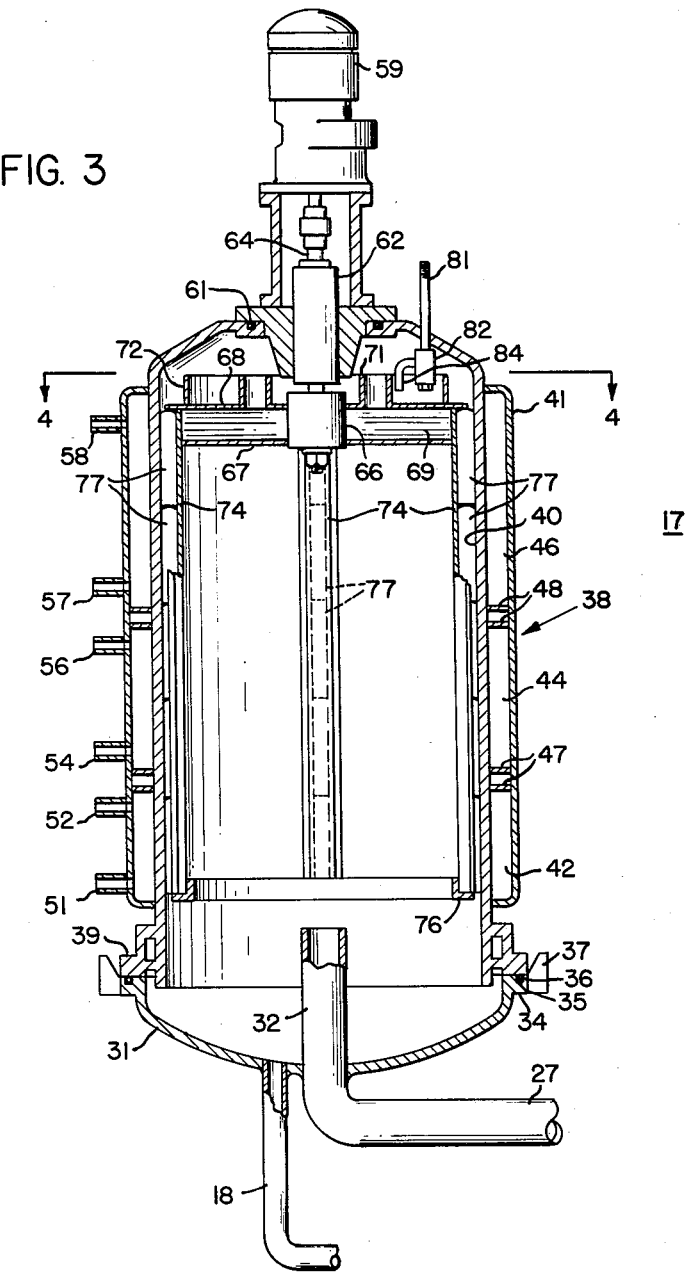

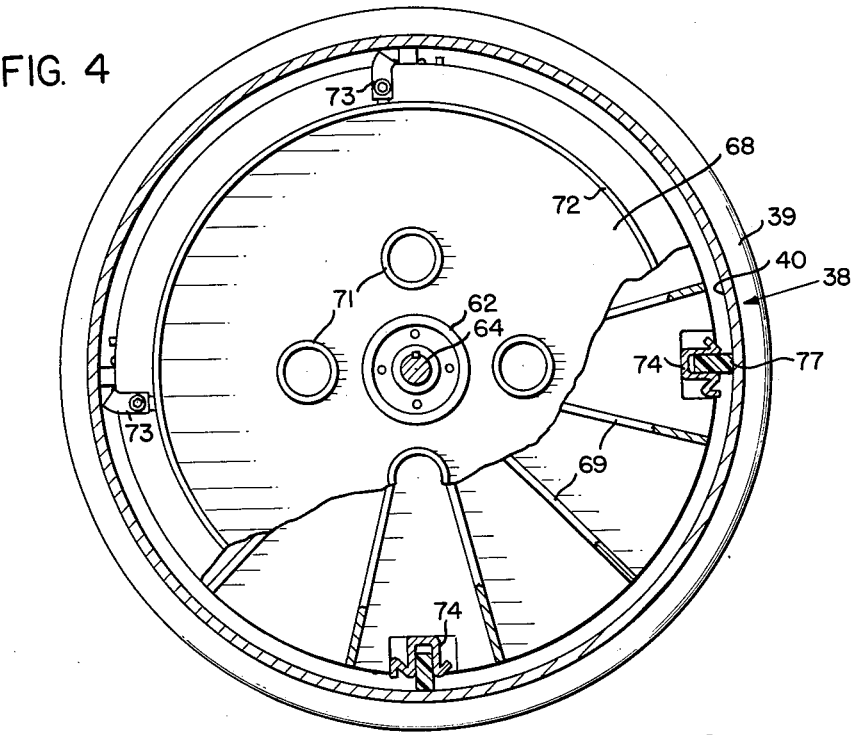
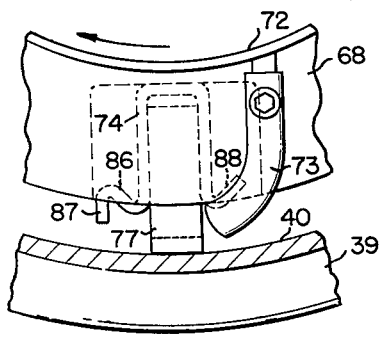
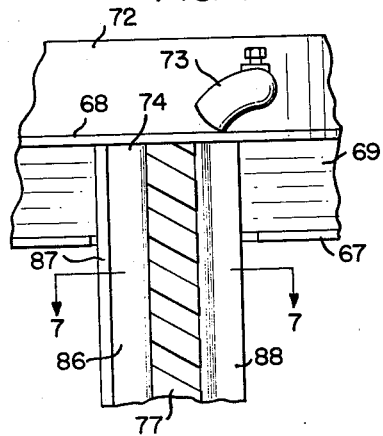
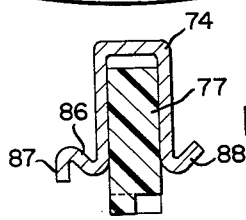

United States Patent Office 3,054,684
Patented Sept. 18, 1962

3,054,684
PROCESS AND APPARATUS FOR TREATING
FLUID MATERIALS
Arthur F. Smith, 1516 Lake Road, Webster, N.Y.
Filed Oct. 14, 1959, Ser. No. 846,484
9 Claims. (Cl. 99—216)

This invention relates to a process for heat treating food products and other materials in a fluid state. More particularly, the invention relates to a process for heat treating milk and milk products, including cream, butter, and cheese, to pasteurize or sterilize them.

Proper pasteurization of milk involves at least three steps. First, every particle of the milk must be heated to the pasteurizing temperature. Secondly, the milk must be held at that temperature for a sufficient period of time to destroy all of the pathogenic bacteria. Finally, the milk must be cooled rapidly to such a low temperature that any bacteria that survived the pasteurizing process are unable to grow at an appreciable rate.

At the present time, the "holder" method of pasteurization is widely employed. According to this method, the milk is heated to approximately 140° F. to 145° F., and held for a prolonged period of time such as, for example, thirty minutes. Usually, the specific temperature employed and the period of holding time at that temperature are governed by local law. The pasteurizing temperature that is used for other milk food products, such as, for example, an ice cream mix, often is higher than the temperature specified for milk.

The "holder" method has the rather obvious disadvantage, from the processor's standpoint, that it is a batch process, and therefore is not very economical. In an attempt to improve the economy of the pasteurizing process, the so called "high-temperature short-time method" was developed, in which the milk is heated to 160° F. or higher for a relatively short period, such as fifteen seconds or longer. This process has the advantage of permitting continuous operation because of the relatively short holding period, but has the disadvantage that temperature control is rather critical and underpasteurization sometimes may occur. On the other hand, if the milk is exposed to 160° F. for too long a period of time, overpasteurization may occur and this affects the creaming ability of the milk adversely.

When pasteurization was first introduced, a method that is often referred to as "flash" pasteurization was practical, in which the milk was heated momentarily to some high temperature and then cooled quickly. At the time when this type of processing was employed, the proper controls and safeguards over the processed product apparently were not observed, and legal restrictions evolved so that this is not a legal method for the pasteurization of market milk in many localities at the present time. However, many industrial installations employ flash pasteurization in the manufacture of milk food products such as, for example, butter and cheese. It is unfortunate that the health laws, that were passed years ago, favored the "holder" technique over the "flash" process, since flash pasteurization is capable of continuous operation and therefore offers opportunities for more economical processing.

There is, therefore, a need for an improved continuous process for the effective pasteurization of market milk, that is sufficiently reliable so that local health authorities can accept it readily.

In the production of evaporated milk, the canned evaporated milk usually is sterilized after canning, while in closed cans, by heating the cans slowly to a temperature of 240° F. to about 245° F. Heating is usually accomplished with hot water and steam in a pressurized chamber that prevents bursting of the cans. During heating, the cans are moved to mix the contents and to insure uniform heating. This is also a holding process, and the holding period generally is about fifteen minutes or more. After sterilization, the cans are cooled, usually by contact with cold water. Sterilization of evaporated milk on a small scale is usually a batch process.

The sterilization of canned evaporated milk is a sensitive process, because the evaporated milk exhibits a tendency to coagulate during sterilization, to form a soft jelly inside the cans. Usually, the cans are shaken violently after sterilization, to break up any jelly that forms. Unfortunately, if the shaking is overdone, the viscosity of the product is adversely affected.

One object of the present invention is to provide a practical, continuous process for heat treating fluid materials, and particularly, fluid food products.

Another object of the invention is to provide a practical and effective process for pasteurizing market milk on a continuous basis.

Another object of the invention is to provide a practical process for heat treating milk food products in a fluid state, that is characterized by an extremely short processing time, so as to permit optimum economic use of the equipment.

Still another object of the invention is to provide a practical continuous method for the biocidal heat treatment of fluid milk food products, that can be practiced by both small and large processors.

A further object of the invention is to provide an economical continuous process of the character described, that is effective, efficient, and consistently reliable.

Other objects of the invention will be apparent hereinafter from the specification and from the recital of the appended claims.

In brief summary of my invention, I have found that fluid materials can be heat treated continuously, in a practical manner, by a three step technique. In the first step of this processing technique, the fluid material is preheated, degassed, and deodorized. In the second step, the fluid is heated rapidly to an elevated temperature, up to about 300° F., under superatmospheric pressure of an inert gas, and then rapidly dropped in temperature to about 40° F. In the third step, the inert gas is separated from the fluid, and the inert gas is recovered for reuse. The fluid product can be packaged directly, or put through further processing if desired. This technique is applicable for the heat processing of any fluid material that is subject, for example, to loss of flavor, potency, or chemical identity, or the like, upon exposure to elevated temperatures in contact with the atmosphere. It is particularly applicable to the processing of milk and of milk food products.

In the drawing:

FIG. 3 is an axial section through a large piece of processing equipment of a preferred construction for practicing the present invention;

FIG. 4 is a section taken on the line 4—4 of FIG. 3, looking in the direction of the arrows, and with the feed plate partly broken away to show the underlying structure of the rotatable frame;

FIG. 5 is a transverse fragmentary section, on an enlarged scale, but taken from the same line and looking in the same direction as FIG. 4, and showing in dotted lines the disposition of a wiper assembly beneath the feed plate, and the disposition of a feed nozzle that is mounted on the feed plate;

FIG. 6 is a fragmentary elevation of the parts shown in FIG. 5, on the same scale, and with the cylindrical body of the device removed in order to show a wiper assembly in elevation, and illustrating a preferred form of wiper element construction; and FIG. 7 is a section taken substantially on the line 7—7 of FIG. 6, looking in the direction of the arrows.

Figure 2:
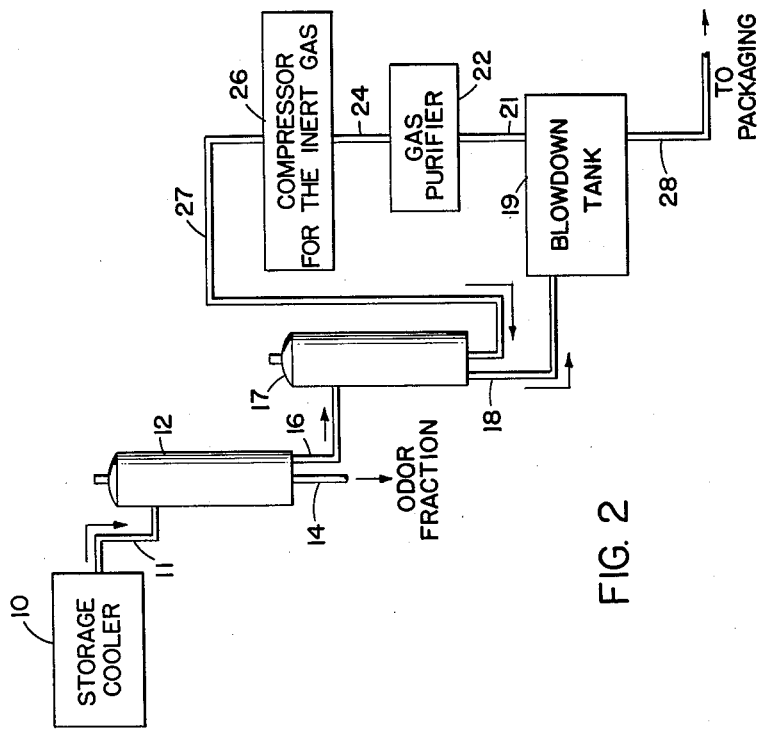
FIG. 2 is a schematic diagram of a layout of apparatus for practicing the process.
Figure 1:
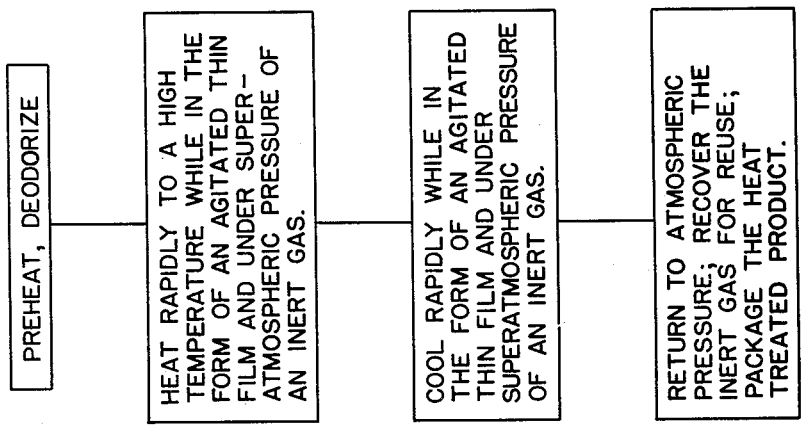
FIG. 1 is a block diagram describing the series of steps by which a fluid material is heat treated in accordance with one embodiment of this invention.

In order to describe the process it is necessary first to describe typical equipment that may be employed to practice the process. Referring now to the drawings by numerals of reference, and particularly to FIG. 2, the numeral 10 denotes a storage tank, cooler, or other source of supply for the material, such as, for example, market milk, that is to be processed. The storage cooler 10 is connected by a line 11 to a mechanical processor 12, that has a construction that will be described in detail presently. The processor 12 is equipped with a distillate discharge line 14, through which distillate that is taken off in the processor 12 can be withdrawn. A discharge line 16 is also connected to the processor 12, for withdrawal of the main body of the milk or other fluid.

The line 16 is connected to supply a second processor 17. A line 18 is connected to the processor 17 to receive the liquid that is discharged from the processor 17, and to deliver it to a large blowdown tank 19 or equivalent device. The tank 19 is equipped with an overhead gas takeoff line 21 to deliver gas from the tank 19 to a gas purifying device 22. A line 24 is connected to deliver gas from the purifier to a compressor pump 26. A line 27 is connected to deliver gas from the compressor 26 to the second processor 17.

A line 28 is mounted to receive liquid from the tank 19 and to deliver it to packaging equipment, or to other processing equipment.

The processors 12 and 17 are generally similar in construction, although some modifications in piping arrangements and some differences in internal structure are necessary, as will be described, to permit these two processors to be operated so as to accomplish their particular purposes. The structure of the two processors will be illustrated by a detailed description of the structure of the second processor 17, as illustrated in FIGS. 3 through 7, inclusive, together with a description of the added features of the processor 12.

The processor 17 is formed with a dished base 31 that can be supported on a concrete support, not shown, or in any other convenient manner. The gas return line 27 is extended beneath the dished bottom 31 and is formed with an upwardly directed, right angle extension 32 that projects through an aperture in the dished bottom 31. The pipe extension 32 is welded to the bottom 31 in fluid-tight fashion. The line 18 is also connected to the bottom 31 adjacent the pipe extension 32, to serve as a drain line.

The base 31 is formed around its periphery with a radially projecting flange 34, and a gasket 35 is disposed in a channel 36 that is formed in the upper surface of the flange 34. At angularly spaced intervals about the circumference of the flange 34, a plurality of upwardly extending dogs 37 are secured.

A generally cup-shaped dome 38 is mounted above the base 31. The dome 38 is formed with a peripheral flange 39 at its lower, open end, that seats on the flange 34 to compress the gasket 36. The flange 39 is proportioned to engage the dogs 37 to permit the dogs to guide the flange 39 to proper seating position on the flange 34, in engagement with the gasket 36.

Internally, the dome 38 is formed with a cylindrical inner surface 40. When the equipment is mounted in its preferred position, the axis of this surface 40 is upright. Externally, the dome 38 is provided with a jacket 41, that is subdivided into three separate compartments, 42, 44, and 46 respectively, by spaced sets of walls 47, 48, respectively. Each of the separate compartments has its own supply and discharge lines: the lowermost compartment 42 has a supply line 51 and a discharge line 52; the middle compartment 44 has a supply line 54 and a discharge line 56; and the uppermost compartment 46 has a supply line 57 and a discharge line 58.

An electric motor and reduction gear assembly 59 is mounted on the upper, closed face of the dome, and is supported thereon by a bearing support 61 that contains a pressure seal stuffing box and bearing indicated generally at 62. A shaft 64, that is driven by the reduction gear, projects downwardly through the stuffing box 62 to the interior of the dome. A collar 66 is secured to the lower end of the shaft 64, and a pair of plates 67, 68 are secured to the collar 66, in axially-spaced relation to each other. A plurality of upright webs 69 (FIGS. 3 and 4) are interposed between the two plates 67, 68, and are welded to the plates, to form a rigid structure. A plurality of nipples 71 are welded to the upper surface of the upper plate 68, with their bores aligned with apertures in the plate, to permit free passage of vapor from one side of the plate 68 to the other. An upstanding wall 72 is secured to the upper surface of the upper plate 68, and is spaced somewhat radially inwardly of the periphery of the plate. Four nozzles 73 are mounted in the wall 72, to discharge liquid from the inner side of the wall to the outside. These nozzles are arranged in a substantially equiangular disposition.

Four axially extending, generally U-shaped channel members 74 are welded, in equiangulary spaced relation, at their upper ends to the upper plate 68, and are welded intermediate their ends to the lower plate 67. The lower ends of these channel members 74 are secured together by a ring 76 (FIG. 3). The ring 76 includes an axially extending web portion and a radially extending web portion that are integrally united; and the radially extending portion provides a stop at the lower end of each of the channels 74.

The assembly of the upper plate 68, lower plate 67, channels 74, and ring 76 provides a frame that is mounted for rotation upon rotation of the collar 66.

Columns of wiper elements 77 are mounted in the channels 74. Each column consists of several individual wiper elements that are mounted one above the other within each channel, in such fashion that they are free to move radially independently of each other under centrifugal force, when the frame is rotated.

The wiper elements 77 may be made of a tough plastic material, such as, for example, polytetrafluoroethylene, with or without added graphite as a filler and lubricant; or from bonded carbon, or a like material that will engage the cylindrical surface 40 with some degree of resilience, and that will not score the surface as it moves over it. Each wiper element 77 is formed, on its radially outer face, with a plurality of radially outwardly projecting portions 78 that are separated by slots 79. The sides of the slots 79 are disposed in parallelism and at an acute angle to a plane that is perpendicular to the axis of the still, and are inclined downwardly from their leading edges, relative to the normal direction of rotation of the frame. The leading and trailing edges of each of the lands 78 extend axially of the surface 40.

Each of the channel members 74 is formed at the radially outward edge of its leading side portion with a flange that extends obliquely inwardly as denoted at 86 (FIG. 5), and then radially outwardly as denoted at 87. Similarly, the trailing side portion of each channel member 74 is formed at its radially outer edge with a flange 88 that extends a short distance obliquely inwardly, as best shown in FIGS. 5 and 7.

To supply liquid that is to be processed, a nipple 81 is mounted on top of the dome, for connection to a supply source. The nippple 81 communicates inside the dome with a pressure relief valve 82, from which the fluid can flow through a short outlet pipe 84. The pipe 84 is disposed to discharge fluid on the upper surface of the plate 68, at a point that is spaced inwardly from the outer edge of the plate. This arrangement permits all of the liquid delivery piping up to the valve 82 to be under pressure.

Ordinarily, the frame will be rotating when fluid flows from the pipe 84 onto the upper surface of the plate 68, and the plate 68 will be rotating at a relatively high rate of speed. Centrifugal force will distribute the liquid in a thin film over the surface of the plate 68, and it will accumulate at the wall 72 and build up. The four adjustable nozzles 73 permit liquid to escape from the mass that accumulates at the inner side of the wall, to be discharged through the nozzles. The discharge ends of the nozzles 73 are disposed to dispense fluid onto the surface 40, adjacent the trailing edges of the channels 74, respectively.

Generally, in operation of the device, the motor 59 is energized to rotate the collar 66, and the frame that is suspended from the collar, in a generally clockwise direction relative to FIG. 5, as indicated by the arrow. As the frame is rotated, the individual wiping elements 77 are thrown radially outward under centrifugal force, independently of one another, until each wiper element engages the cylindrical surface 40.

Liquid is supplied through the nipple 81, the pressure relief valve 82, and the discharge pipe 84, and it falls on the upper surface of the rapidly rotating plate 68, and is distributed thereover in a thin film. The liquid builds up at the wall 72, and escapes through the nozzles 73. The nozzles 73 discharge the liquid onto the upper end of the cylindrical surface 40. The liquid falls downwardly on this surface, under the influence of gravity, and because some of it adheres to the surface, it spreads over the surface in a thin film.

The leading, axially-extending edges of the projecting portions 78 of the wiper elements 77 engage the surface 40, and by a scraping or wiping action, remove from the surface, as they engage it, all of the liquid film on the surface. The removed liquid tends to accumulate for a brief instant at the leading edges of the respective projecting portion 78, and then runs into the slots 79, where it is accelerated downwardly and then discharged back onto the surface 40. The liquid that is discharged back onto the surface again flows downwardly over the surface in a thin film, but over an axially downwardly displaced portion of the surface from the portion of the surface from which it was removed. The wipers thus exert a pumping action, removing the liquid and then reapplying it at axially lower portions of the surface, and eventually throwing it downwardly from the lower end of the surface 40 into the base 31. The removed liquid is maintained in a highly agitated, turbulent state, and thorough mixing of the fluid occurs before any of the removed fluid is reapplied to the cylindrical surface 40.

Therefore, the process of applying the liquid to the surface 40 in a film, properly wiping it therefrom, accelerating it in a downward direction, and agitating it thoroughly in the process, is repeated to cause the liquid progressively to traverse the axial length of the surface 40, under the combined action of gravity and of the wiper elements 77. The total passage time for liquid, through a processor of the character described, is exceedingly brief because of the accelerating or pumping action of the wiper element 77, even though the liquid may have a relatively high viscosity.

The processor illustrated should be modified somewhat however, for use as a preheater, deodorizer and degasser, as the processor 12 is used in FIG. 2. In order to perform these functions, the structure shown in FIG. 3 preferably is modified by mounting a condenser rigidly relative to the surface 40 but within the rotatable frame, and by providing concentric reservoirs in the base 31 for separate recovery of the distillate from the condenser and the residue that drops downwardly from the surface 40. Moreover, means should be provided for continuous evacuation of the processor. A processor of this general construction is illustrated in my copending patent application Serial No. 571,626, filed March 15, 1956, now U.S. Patent 2,955,990.

Since the wipers have a scraping action that removes the liquid film positively from the cylindrical surface and accelerates the removed liquid downwardly over this surface, even exceptionally viscous materials can be handled successfully in this processor. The shape and disposition of the projecting portions 78 of the wiper elements preferably are such that the wiper elements in each column, as they move over the surface 40, engage every portion of the surface. To accomplish this, as shown in FIG. 6, the uppermost edge of one projecting portion 78 is disposed at a higher elevation than the lowermost portion of the next above projecting portion 78. Moreover, since each column of wiper elements comprises a plurality of separate individual wiper elements that are free to move radially independently of each other, under the influence of centrifugal force, the entire surface 40 is continuously engaged even though the surface may not be exactly a true cylinder. The wiper elements therefore are automatically compensated for wear. The uniform wiping action, that is obtained by taking advantage of centrifugal force, prevents the formation of hot spots where burning and charring can occur, to form carbon deposits that accumulate and eventually create buildups that are sources of trouble and that prevent efficient operation.

In most cases, the speed of rotation of the frame is such that the liquid that is travelling downwardly over the surface 40, in thin film form, is acted upon by three, four, or more columns of wipers, as the liquid traverses the liquid processor.

Referring now to FIG. 2, the use of the general plant layout, that is there diagrammatically indicated, will now be described in connection with the pasteurizing of market milk. The milk is transferred from a storage cooler 10 through the line 11 into the liquid processor 12, through the agency of suitable pumps (not shown). The processor 12 is evacuated to a pressure of 29" of vacuum (in terms of mercury), or thereabouts. The heating jacket on the processor 12 is supplied with steam to raise the jacket temperature to about 150° F. As the milk traverses the cylindrical surface of this processor, it is maintained in a high state of turbulence and agitation. Extremely high heat exchange efficiency is obtained, so that as the milk leaves the heated cylindrical surface, substantially every particle of milk is at the same temperature. Under reduced pressure, the odors present in the milk pass off, and are either removed as vapors in the pumping system, or are condensed on the condenser and removed as a distillate fraction. Preferably, the temperature and pressure in this processor are regulated so that a small amount of water, on the order of about 1% or less by weight of the milk, is taken off. Substantially all of the gas, that is dissolved or entrained in the milk, is also removed in this processor.

The heated milk is transferred from the base of the processor 12 through the line 16 into the second processor 17. This may be accomplished by a gear pump or the like (not shown). There is no holdup in the base of the processor 12, and the milk is transferred substantially immediately from the base of the processor 12 into the second processor 17.

The second processor 17 is operated in a particular manner, to accomplish extremely rapid heating, followed by extremely rapid cooling. The uppermost compartment 46 of the processor 17 is heated by steam to a temperature in the neighborhood of 300° F. The middle compartment 44 contains circulating cooling water at a sufficiently low temperature to cool the milk to 100° F. or lower. The lowermost compartment 42 contains circulating refrigerating gas or brine, or the like, to cool the milk to a temperature of 40° F. or lower.

The milk that is supplied to the processor 17 normally is at a temperature in the neighborhood of 150° F. As the milk passes down over the cylindrical surface 40 of the processor 17, the temperature is raised rapidly to about 300° F. or thereabouts, through contact with the steam-heated surface.

To secure adequate residence time in contact with the steam-heated portion of the cylindrical surface 40, in designing the processor 17, the length of the high temperature portion of the cylindrical surface 40 and its associated heating compartments 46 may be adjusted to any desired length to take care of the necessary time factor. Alternatively, a simpler expedient is available in modifying the shape of the wiper elements 77 that are mounted in the channels to engage this portion of the cylindrical surface 40. Referring now to FIG. 6 in particular, it will be noted that the projecting portions 78 of the wiper elements are sloped downwardly from their leading edges to their trailing edges. This arrangement of the wiping elements accelerates the movement of the liquid over the cylindrical surface 40. To slow down the rate of movement of the fluid over the cylindrical surface, the slope of the projecting portions 78 can be altered so that the effect of the wiper elements is less marked; or, the slope of the projecting portions 78 can be made opposite to that shown, so that the removed fluid is directed upwardly rather than downwardly. With the latter arrangement, the wipers tend to lengthen the time to traverse the surface 40.

As the milk travels downwardly over the steam-heated portion of the cylindrical surface 40, it eventually reaches the portion of that surface that is cooled by the middle compartment 44 of the heating jacket. Because of the extreme agitation and high turbulence that is maintained in the milk by the action of the wipers, the temperature of the milk drops extremely rapidly. Moreover, the film is sufficiently thin, and the liquid is maintained in such a turbulent state, that the film substantially is in equilibrium from one of its film surface to the other.

The milk then moves over the portion of the cylindrical surface 40 to the coldest and lowermost portion, that is cooled by the cold fluid that is circulated through the lowermost compartment 42 of the jacket 41. The milk that is dropped from the lowermost edge of the cylindrical surface 40, into the base 31, is at a temperature of about 40 F. or lower, suitable for bottling.

Throughput time is extremely brief, and total time from the inlet or supply line 81 to the discharge line 18 is less than ten seconds.

During passage over the cylindrical surface 40 in the processor 17, the milk is thus subjected to heat exchange in three different zones. In the first zone, it is heated to a sufficiently high temperature, for a sufficient length of time, to effect a kill of all pathogenic bacteria. If the residence time in this zone is adjusted to be sufficiently long, other micro-organisms may be killed also, and sterilization can be effected without subjecting the milk to undue thermal hazard or adverse effect.

To prevent vaporization and consequent undesired concentration of the milk, nitrogen under pressure is introduced continuously into the processor 17 through the line 27. The extension 32 of this line projects above the level of any liquid in the base 31, to prevent splashing. The pressure of the inert gas prevents substantial evaporation of the milk, and its inert character prevents oxidation of the milk and consequent loss of flavor. Pressures on the order of 65 p.s.i. and higher suffice, but lower pressures can be employed successfully where the maximum temperature, that is attained by the milk, is lower than 300° F.

The heat-treated milk is discharged from the base 31 through the line 18. Because of the high pressure in the processor 17, the gas pressure alone can be employed to discharge the treated milk. The milk and some gas pass from the line 18 into the blowdown tank 19. This tank 19 preferably has a relatively large volume, and the gas and liquid separate readily. The liquid settles to the bottom of the tank, and the gas passes off through the line 21 into a purifier 22. The purifier may be any low-resistance purifying device, such as, for example, a Cottrell precipitator or a filter. The purifier 22 removes entrained liquid particles from the gas, and the purified gas is passed through the line 24 into a compressor or pump 26. The compressor compresses the gas to the proper pressure and returns it through the line 27 to the processor 17.

The treated milk, that settles in the tank 19, is discharged from the tank through a line 28 into appropriate packaging or processing machinery.

For particular purposes, the arrangement of equipment can be varied to suit particular needs. For example, for some purposes, it may be desirable to homogenize the milk or other milk food product as a part of the process, and a homogenizer can be used either before or after the heat treatment, as desired. For the production of evaporated and condensed milks, additional processing units can be employed. For example, additional processors of the same character as the processor 12 can be instered in series with the processor 12, and instead of simply deodorizing and degassing the milk as in the processor 12 in accordance with the process described, substantial evaporation can be caused to occur to remove a large proportion of the water from the milk.

For most purposes, the inert gas will be nitrogen, since this gas is cheap and readily available, but other inert vapors or gases could be used.

While the process described has particular attraction for pasteurizing market milk, for sterilizing evaporated milk prior to canning, and for sterilizing and concentrating milk prior to spray drying, the process is also applicable to the heat treatment of many other fluid food products, including, by way of example, ice cream mixes, cheeses, butter, prepared foods such as mayonnaise, salad dressings, and the like. The process also offers a method for pasteurizing thermally unstable materials such as vitamin concentrates under non-oxidizing conditions.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A continuous process for the treatment of a flowable, edible material, comprising flowing the material in the form of a thin film downwardly over an axially-elongate, internal, upright surface of revolution of a body, continuously mechanically agitating said film, effecting heat exchange with said material by conductive thermal contact with said surface and while on said surface in a heat exchange zone that extends over an axially-extending area of said surface, to impart at least sufficient heat energy to said material to pasteurize it, and maintaining said material throughout under superatmospheric pressure of a gas that is inert relative to said material, to control and to restrain the rate of evaporation from said material.

2. A continuous process for the treatment of a flowable, edible material, comprising flowing the material in the form of a thin film downwardly over an axially-elongate, internal, upright surface of revolution of a body, continuously mechanically agitating said film, effecting heat exchange with said material by conductive thermal contact with said surface and while on said surface in a plurality of heat exchange zones that extend over different axially-extending areas of said surface of revolution respectively, to impart at least sufficient heat energy to said material in at least one of said zones to pasteurize it and to remove heat energy from said material in at least one other of said zones, and maintaining said material throughout under superatmospheric pressure of a gas that is inert relative to said material.

3. A process in accordance with claim 2 in which said material is an edible fluid milk food product.

4. A process for the heat treatment of milk comprising removing dissolved and entrained gas from the milk, preheating it, flowing the milk in the form of a thin film downwardly over an axially-elongate, internal, upright surface of revolution of a body, continuously mechanically agitating said film and accelerating it over said surface, effecting heat exchange with said milk by conductive thermal contact with said surface and while on said surface in a plurality of heat exchange zones that extend over different axially-extending areas of said surface respectively, first to impart at least sufficient heat energy to said milk to pasteurize it, then to remove heat energy from the milk to cool it while still on said surface, and then collecting cooled, pasteurized milk from said surface.

5. A process in accordance with claim 4 including the step of maintaining the milk under superatmospheric pressure of a gas that is inert relative to the milk, while on said surface, to control the rate of evaporation from the milk.

6. A process for the heat treatment of milk comprising flowing the milk in film form, deodorizing and degassing the filmed milk by subjecting it to conditions of temperature and of subatmospheric pressure to remove a small amount of water up to 1% by weight of the milk and to remove dissolved and entrained gases, preheating it, then flowing the milk in the form of a thin film downwardly over an axially-elongate, internal, upright surface of revolution of a body, continuously mechanically agitating said film and accelerating it over said surface, effecting heat exchange with said milk while on said surface in a plurality of heat exchange zones that extend over different axially-extending areas of said surface respectively, first to impart at least sufficient heat energy to said milk to pasteurize it, then to remove heat energy from the milk to cool it while still on said surface, and maintaining the milk while on said surface under superatmospheric pressure of a gas that is inert relative to the milk, to control the rate of evaporation from the milk.

7. A continuous process for the treatment of a flowable, edible material, comprising flowing said material in the form of a thin film downwardly over an upper part of an axially-elongate, internal, upright surface of revolution in a body, continuously removing the film from said surface, collecting the removed liquid in a plurality of axially-spaced accumulations, and returning the accumulations to said surface again to flow downwardly thereover in a film, thereby repeatedly to place fresh liquid surfaces in contact with said surface of revolution, effecting heat exchange with said material by conductive thermal contact with said surface and while on said surface in a plurality of heat exchange zones that extend over different axially-extending areas of said surface of revolution respectively, to impart heat energy to said material in at least one of said zones and to remove heat energy from said material in at least one other of said zones, and maintaining said material throughout under superatmospheric pressure of a gas that is inert relative to said material.

8. Apparatus for processing fluid material in film form comprising a body having a chamber that is bounded by a wall that is formed to provide an internal, axially-elongate surface of revolution having an upright axis, means for supplying said material to an upper portion of said surface to flow downwardly thereover in a film under the influence of gravity, means mounted for rotary movement in said chamber for mechanically engaging said surface to agitate said flowing film upon rotation thereof, and means comprising separate heat exchange facilities for adjusting the temperature of said wall along different axially-extending portions thereof, respectively, for effecting heat exchange with said material by conductive thermal contact with said surface and while on said surface in a plurality of heat exchange zones that extend over different axially-extending areas of said surface of revolution that correspond to said different wall portions respectively, first to impart heat energy to said material in at least one of said zones and then to remove heat energy from said material in at least one other of said zones.

9. Apparatus in accordance with claim 8 including means for maintaining said chamber under superatmospheric pressure of a gas that is inert relative to said material.

References Cited in the file of this patent

UNITED STATES PATENTS

| | | |
|---|---|---|
| 1,225,348 | Merrell | May 8, 1917 |
| 2,685,522 | Dunmire | Aug. 3, 1954 |
| 2,870,024 | Martin | Jan. 20, 1959 |
| 2,993,842 | Smith | July 25, 1961 |

FOREIGN PATENTS

| | | |
|---|---|---|
| 807,857 | Great Britain | Jan. 21, 1959 |